United States Patent
Surna et al.

(10) Patent No.: US 9,547,674 B2
(45) Date of Patent: Jan. 17, 2017

(54) NORMALIZING DATA FOR FAST SUPERSCALAR PROCESSING

(71) Applicant: Microsoft Corporation, Redmond, WA (US)

(72) Inventors: Aleksandras Surna, Redmond, WA (US); Erik Ismert, Shoreline, WA (US); Srikumar Rangarajan, Sammamish, WA (US); Nimish S. Khanolkar, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 149 days.

(21) Appl. No.: 14/154,159

(22) Filed: Jan. 13, 2014

(65) Prior Publication Data

US 2014/0129525 A1  May 8, 2014

Related U.S. Application Data

(62) Division of application No. 12/773,889, filed on May 5, 2010, now Pat. No. 8,631,039.

(51) Int. Cl.
*G06F 17/30* (2006.01)
*G06F 9/30* (2006.01)

(52) U.S. Cl.
CPC ..... *G06F 17/30303* (2013.01); *G06F 9/30192* (2013.01); *G06F 17/30569* (2013.01)

(58) Field of Classification Search
USPC .................................................. 707/790, 812
See application file for complete search history.

(56) References Cited

U.S. PATENT DOCUMENTS

| | | | | |
|---|---|---|---|---|
| 5,983,255 A * | 11/1999 | Musicus et al. | ............... | 708/300 |
| 6,539,396 B1 * | 3/2003 | Bowman-Amuah | ......... | 707/769 |
| 6,820,262 B1 * | 11/2004 | Tellez et al. | .................. | 718/106 |
| 6,823,329 B2 * | 11/2004 | Kirk et al. | ..................... | 707/713 |
| 7,082,436 B1 * | 7/2006 | Bayiates | ....................... | 707/770 |
| 7,107,280 B2 * | 9/2006 | Tomic et al. | ................. | 707/783 |
| 7,197,500 B1 * | 3/2007 | Israni et al. | .................. | 707/809 |
| 7,233,938 B2 * | 6/2007 | Carus et al. | ...................... | 705/2 |
| 7,386,562 B2 * | 6/2008 | Long | ............................. | 707/694 |
| 7,680,867 B2 * | 3/2010 | Green et al. | .................. | 707/811 |
| 2009/0171999 A1 * | 7/2009 | McColl et al. | ............... | 707/101 |

* cited by examiner

*Primary Examiner* — Kim Nguyen
(74) *Attorney, Agent, or Firm* — Brian Haslam; Kate Drakos; Micky Minhas

(57) ABSTRACT

A data normalization system is described herein that represents multiple data types that are common within database systems in a normalized form that can be processed uniformly to achieve faster processing of data on superscalar CPU architectures. The data normalization system includes changes to internal data representations of a database system as well as functional processing changes that leverage normalized internal data representations for a high density of independently executable CPU instructions. Because most data in a database is small, a majority of data can be represented by the normalized format. Thus, the data normalization system allows for fast superscalar processing in a database system in a variety of common cases, while maintaining compatibility with existing data sets.

15 Claims, 4 Drawing Sheets

NORMALIZING DATA FOR FAST SUPERSCALAR PROCESSING

BACKGROUND

Superscalar central processing units (CPUs) that can execute more than one instruction per clock cycle are becoming more and more common for computing systems. Unlike pipelined architectures, superscalar architectures include multiple, redundant functional units that can operate on many instructions in parallel. Superscalar architecture and pipelining can be used together to provide even more CPU efficiency. Superscalar processing depends in part on the processor being provided with (or detecting on its own) instruction streams that are intrinsically parallel, meaning that the stream contains operations that operate on independent sets of data or in a way that order of execution between the operations will not lead to different results. This allows the processor to perform multiple operations at the same time.

Most database systems were implemented before superscalar CPUs started to dominate the market. Superscalar CPUs process data faster provided there are enough independent instructions inside small instruction windows (e.g., on the order of up to ~100 instructions). In such cases, superscalar processors can detect enough independent operations to utilize multiple available CPU execution units. Independent operations are those with no data or control flow dependencies between them. Database systems often rely on optimizations that are no longer efficient for superscalar architectures. For example, a database implementation may include long functions with many conditional branches.

To take advantage of superscalar CPUs, databases need to improve data warehouse processing to achieve higher efficiency in processing for a majority of data warehouse specific data values. Current internal data representations do not lend themselves to efficient scalar processing. Database systems provide many data types, such as integers, strings, floats, binary blobs, and so forth that may each include a different type of internal data structure or other representation. Some of these are more appropriate for superscalar processing than others. Code paths have to be constructed with care to ensure very efficient processing and high density of independent CPU instructions, which often is not the case for database systems being used on superscalar processors. Various specialized data warehouse engines have been built to take advantage of superscalar CPUs, such as Monet DB/X100 and Microsoft Analysis Services. However, these engines are not generic relational database management system (RDBMS) engines and provide advantages only in limited situations that do not address superscalar issues with the database system core.

SUMMARY

A data normalization system is described herein that represents multiple data types that are common within database systems in a normalized form that can be processed uniformly to achieve faster processing of data on superscalar CPU architectures. The data normalization system includes changes to internal data representations of a database system as well as functional processing changes that leverage normalized internal data representations for a high density of independently executable CPU instructions. Because most data in a database is small, a majority of data can be represented by the normalized format. The system includes functions that optimistically attempt to handle all data in a batch as normalized, and to do so compactly with few control flow dependencies. During fast processing, the algorithm identifies data that is not normalized and sets that data aside for later processing by a traditional, slower algorithm that may not be as superscalar-efficient. Thus, the data normalization system allows for fast superscalar processing in a database system in a variety of common cases, while maintaining compatibility with existing data sets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
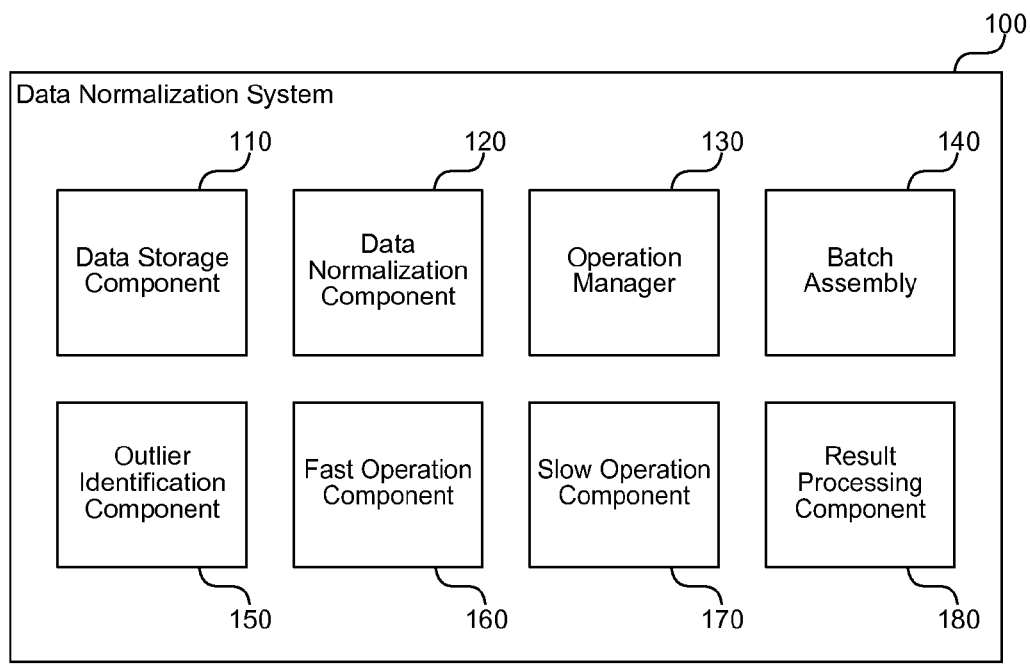
FIG. 1 is a block diagram that illustrates components of the data normalization system, in one embodiment.

A data normalization system is described herein that represents multiple data types that are common within database systems in a normalized form that can be processed uniformly to achieve faster processing of data on superscalar CPU architectures. The data normalization system includes changes to internal data representations of a database system as well as functional processing changes that leverage normalized internal data representations for a high density of independently executable CPU instructions. In some embodiments, the system stores data using a 64-bit binary value that can either represent a normalized data type or act as a pointer to a non-normalized data type for those data types that do not fit the normalization scheme. For example, 64-bits may be insufficient for storing some types of data, like a long string or a long binary blob. In some embodiments, a bit of the 64-bit binary value is reserved to indicate whether the value represents a normalized data type or not (e.g., the significant bit can be used for this purpose so that a simple CPU shift instruction can be used to extract data from the remaining 63 bits). Once all data is represented in a common format, it is easier to provide functional processing that operates on such data in a superscalar-efficient manner. Because most data in a database is smaller than the size of the 64-bit data value (e.g., a street number, phone number, amount of sales in a region, and so forth), a majority of data can be represented by the normalized format.

The system includes functions that optimistically attempt to handle all data in a batch as normalized, and to do so in compact ways (e.g., a tight loop) with few control flow dependencies. For example, for a batch of column data having a column each from two sources to be added together, the system may optimistically assume that all of the data in the columns fits into the normalized scheme described herein, and process the data using a fast algorithm that allows each row value in the columns to be added independently within the CPU. For hundreds of rows of data this can result in a dramatic execution speed improvement. During fast processing, the algorithm identifies data that is not normalized (e.g., using the bit described above), and sets that data aside (e.g., by ignoring it or placing it on a separate list) for later processing by a traditional, slower algorithm that may not be as superscalar-efficient. For example, the system can make two passes through a set of column data, one to perform operations for those rows that contain normalized data that can be handled quickly and another to perform operations for those rows that contain non-normalized data that is processed in a traditional manner. Thus, the data normalization system allows for fast superscalar processing in a database system in a variety of common cases, while maintaining compatibility with existing data sets.

In some embodiments, the data normalization system establishes a convention for representing NULL data values in the data set. For database systems, a NULL value is a different value than a numeric zero, and thus may not be able to be represented in the normalized format in the same way that zero is. Because the normalized format contains a bit for indicating non-normalized data, the system can use setting the non-normalized bit in combination with a null value for the portion that would normally point to the non-normalized data as an indication of NULL. This allows the system to cover a much broader set of common values (NULL) within the normalized format.

In some embodiments, the data normalization system includes hash join and hash aggregation algorithms that reduce a number of CPU instructions needed to perform their task. These algorithms may also minimize data and control flow dependencies for a majority of data processing to efficiently utilize superscalar CPU resources. These processing techniques are described further herein.

Superscalar CPUs are able to execute multiple instructions in single CPU cycle provided: a) each instruction performs a simple scalar calculation, and b) there are no data dependencies in a set of operations processed by the CPU in a cycle. The data representation described herein satisfies the first condition for a majority of data values so that processing can occur using as few CPU instructions as possible. Most modern CPUs can perform a variety of native operations on 64-bit values. The data normalization system satisfies the second condition by improving data processing algorithms so that the CPU has sufficient number of independent operations to perform in close proximity in a particular code path. In data warehouse scenarios, if an array of data is to be processed then usually each array element's processing is independent from other elements. The system overlaps processing of one array element with processing of one or many other array elements to provide multiple independent instructions for the superscalar CPU to execute. The system overlaps processing in part by making array-processing loops very short so that the CPU can easily recognize the parallelism. In these cases, a set of CPU instructions processed in a CPU cycle will include instructions from individual loop iterations. Alternatively, the system overlaps processing by merging data processing tasks of two or more separate loop iterations into a single instruction stream.

In some embodiments described herein, the data normalization system uses a 64-bit or 8-byte value to represent common data types. A 64-bit value is currently a good choice because most data types will fit in 64 bits (e.g., integers, dates, floats, short strings, Booleans, and so forth). Widely available processors also are natively able to process 64-bit values from registers or memory in a single instruction. However, those of ordinary skill in the art will recognize that it has been the nature of computing to utilize more space over time, and the system herein could be easily extended to use a value that includes more than 64 bits (e.g., 128 bits). Conversely, there may also be situations where using smaller values would be useful, such as mobile or embedded scenarios where memory is constrained, and the system can be adapted to use a smaller number of bits (e.g., 32-bit). The 64-bit value is used herein as an example, but is not intended to limit the system described to any particular bit or byte size implementation.

In the 64-bit example, the data normalization system provides a data representation for NULL and common integer, numeric, and string data type values in a RDBMS. This particular representation uses eight bytes, where the least significant bit (LSB) is zero to indicate that the value is of a common type (i.e., frequently used) and can be processed using the fast techniques described herein. Another bit could also be used (e.g., the most significant bit), and those of ordinary skill in the art will recognize that endian-ness of the system and other considerations can affect the bit chosen. In addition, the system can also use values that do not encode an indication of whether the value is a normalized type within the value itself. In the present example, the remaining 63 bits represent the value itself (e.g., a number for a numeric value, or several characters for a short string value). Such common values can be processed very efficiently to meet the first condition described in the previous paragraph. If the least significant bit is one and the rest of bits are zero then it indicates a relational NULL value. If the least significant bit is one and any other bit is non-zero, then the remaining 63 bits represent a pointer or other reference (e.g., an index) to an uncommon data type domain value. The system processes non-normalized data outside of tight processing loops so as not to interfere with superscalar CPU specific optimizations. Note that in many cases, such as sum and comparison operations, the system can ignore the least significant bit and perform the operation without shifting the normalized value to remove the bit. Rather, the system may only need to shift the value at the end of processing to convert data back from normalized into native representation.

One example of a common database data type that can be represented using this format is the big integer (bigint) provided by Microsoft SQL Server. The bigint data type in Microsoft SQL Server covers range of integer values [$-2^64$ . . . $2^64-1$]. The system can represent all but the extreme values within the 63 bits available in the normalized data representation. A majority of user data fits into this range. For other values, the system uses a conventional representation for bigint values (i.e., for very large positive and very small negative values). Another example is a column containing a varchar(10) data type, which is a string value having a limit of 10 characters. Where string column data is likely to only hold a small set of values (e.g., two letter abbreviations or full names of U.S. states), databases often use a dictionary approach where the database stores a dictionary of all of the string values and stores an index in the column data that points to the appropriate location to find the string in the dictionary. The data normalization system uses the normalized data representation whenever strings reside in the column store dictionary and can be identified using a 63-bit integer index. The system may reserve several bits in the normalized value to identify a dictionary (there may be more than one) and then the rest of the bits identify a string within the dictionary. Otherwise, the system uses a conventional representation with a pointer pointing to the actual string value. The system can also include string data directly in the 63-bits when the string data is sufficiently short (e.g., less than four or eight characters depending on whether ANSI or UNICODE encoding is used).

In these two examples data value comparisons for the normalized representation for aggregation purposes can be performed using just one CPU instruction and can fit into a small instruction window that leverages superscalar CPU processing. Whether the data type is varchar or bigint, the same function can compare the data by directly comparing the 64-bit integer value. However if involved values are conventional (non-normalized) then comparison can be performed using slower conventional processing. The data normalization system assembles data into arrays called batches and processes batches using either small loops or merged loop iterations. This leverages abilities of superscalar CPUs and increases data processing performance. At the same time, the system detects any small subset of data that has conventional representation or involves complex data processing (like arithmetic error handling). The system performs this more complex data processing as a separate post-processing step outside of the main processing loop. This processing step may be slower and may not fully leverage abilities of the superscalar CPU. However, slow processing of a small subset of data will not affect overall performance significantly.

One example is a hash join. In a hash join whenever a join is performed on a normalized key value and a hash table bucket has the only one potential match, the system can use a tight CPU instruction loop to perform the join. If one of these conditions is not met, then the system does not perform more complex handling immediately, as that might interfere with superscalar CPU optimizations. Rather, the system identifies rows that do not meet fast processing conditions and processes that data later using a post-processing step. Similarly, during hash aggregation in a first pass the system computes results if all involved values have normalized representation. If at least one aggregation key or intermediate result is not in normalized representation or if the system identifies other problematic conditions (such as a potential for arithmetic overflow in calculations), then the system postpones row processing for a slower second processing step. However, a majority of data is processed very quickly using the first processing step that is able to leverage the strengths of the superscalar CPU.

Common operations in data warehouse processing include operations such as: copy column (for example from user table into hash table), compare column value for "group by" or join purposes, hash column value, compute sum of column values. These operations work much faster if performed over a single fixed-size data type (e.g., 64-bit integers). Most database systems support many scalar data types, and each data type has its own implementation of comparison, sum, and copy operations. Sometimes these type-specific implementations are complex (e.g., adding 2 high-precision numeric values may take >100 CPU instructions). Adding 64-bit integers takes just one CPU instruction on modern CPUs. The system treats all normalized values described herein as integers for copying, sum, and comparison purposes.

The extra bit check imposed by the implementation described is low overhead because a database system includes similar checks for NULL values already. In addition, in most cases values will be represented as normalized, so the extra bit check has a predictable outcome (improving CPU pipeline utilization). Some functional processing of the data normalization system can avoid the bit check at runtime if all values processed in given a part of a query plan are known to be normalized.

As an example, suppose a column data type is numeric (20,2) (total 20 digits precision, 2 digits after decimal point). The value 10.01 can be represented as 1001 normalized integer value. Value 999999999999999999.99, however, cannot be represented using normalized form (because it does not fit into a 64-bit integer) and for those values, the system can fall back to a slow code path to process those values. Fortunately, such large values are very rare. If the system receives a request to add two numeric(20,2) columns then the type of the result is numeric(21,2). The system can add two normalized values using one instruction (or potentially slightly more to check for overflow) and the result is still normalized. The system can also multiply integer values, and the result will be still normalized without any need to perform division because type derivation adjusts the decimal point location to numeric(38,4). Other types can be handled similarly, such as strings (described previously), integers (int), financial values (e.g., smallmoney), dates (e.g., datetime), and certain ranges of floating point numbers (e.g., float). Unlike previous in-memory database techniques that normalize based on storage format, the data normalization system normalizes based on type derivation (i.e., making all types or many types fit within a common representation).

FIG. 1 is a block diagram that illustrates components of the data normalization system, in one embodiment. The system 100 includes a data storage component 110, a data normalization component 120, an operation manager 130, a batch assembly component 140, an outlier identification component 150, a fast operation component 160, a slow operation component 170, and a result-processing component 180. Each of these components is described in further detail herein.

The data storage component 110 stores database data persistently between sessions of use of the system 100. The data storage component 110 may include one or more files, file systems, hard drives, storage area networks (SANs), cloud-based storage services, or any other facility for persisting data. The system 100 may be implemented within a previously existing database core, such as Microsoft SQL Server, or as an add-on or new type of data processing facility.

The data normalization component 120 retrieves data stored by the data storage component 110 and loads the retrieved data into memory in a normalized data representation that allows fast superscalar processing. The normalized data representation includes a common format (such as a fixed size value) for storing multiple data types, so that processing of normalized data can be handled in a unified manner for a variety of data types. The uniformity of data also increases potential parallelism when executing on massively parallel or superscalar CPUs. The data normalization component 120 also provides an in-memory representation of data that is not normalized, by providing a normalized value that includes a pointer to a data structure for storing non-normalized values. Although this may incur a slightly higher use of memory, the system 100 benefits from the unified processing of data of various types. The data normalization component 120 may select an appropriate normalized representation for each data type based on a type of the data, a number of values of the data that fall within a normalizable range, a level of precision of the data, a length of string data, and so forth.

The operation manager 130 manages requests to perform database operations on stored database data. For example, the operation manager 130 may include a query engine that receives queries from users or applications, develops a query plan, executes the query against an in-memory or loaded data set, and provides results back to the requestor. The operation manager 130 invokes the other components of the system 100 to perform queries and other operations in a manner that leverages available hardware, such as superscalar CPUs, efficiently.

The batch assembly component 140 identifies batches of data that have control flow and data independence such that the batch includes multiple instances of parallelizable operations. For example, the batch assembly component 140 may scan an array of data values and identify whether the data values include a majority or other threshold of values represented in the normalized data representation described herein. The batch assembly component 140 may also separate data into groups such that each group can minimize control flow interruptions (e.g., branches or excessive conditional checking) and perform multiple operations efficiently on a superscalar CPU or set of CPUs.

The outlier identification component 150 identifies data values in a batch of data that cannot be performed by a fast processing path that performs efficient superscalar processing. The outlier identification component 150 can be implemented in a variety of ways, from managing a second pass through the batch of data after a first fast pass has completed, to separating outlying data into a separate data structure, such as a list of remaining data to be post-processed. The outlier identification component 150 may traverse an array of data and identify values in the array that are not represented in the normalized data representation. The component 150 may place those values on a queue for post processing or flag the values in place for later processing. In some embodiments, the outlier identification component 150 and fast operation component 160 are merged into a single component that performs a fast first pass and detects outlying data at the same time. In such cases, the component sets the non-normalized data aside for slower post-processing.

The fast operation component 160 provides instructions to a superscalar processor in a manner that allows parallel execution of the instructions by multiple functional units of the superscalar processor. For example, the fast operation component 160 may include functions for adding, comparing, or performing other operations on data in a tight loop or with multiple independent loop operations executable in each loop iteration (or a combination of these). The fast operation component 160 may include separate functions or a conditional branch within a function that take the fast processing path for data that is represented in the normalized data format. Because the majority of data types and values are represented in the normalized data format, the system 100 achieves faster execution of common database operations by using the fast operation component 160 in a majority of operation processing.

The slow operation component 170 performs database operations on data within a batch that is not stored in the normalized data representation. The slow operation component 170 is less concerned with fast superscalar execution and performs the additional processing for handling data types that are not handled in a unified manner. For example, the component 170 may process data that is expected to include arithmetic overflow, data that is large or of a nonstandard type, and so forth. The slow operation component 170 implements the type of processing of traditional database engines that did not leverage superscalar processing techniques like those described herein.

The result processing component 180 gathers results from the fast operation component 160 and slow operation component 170 and returns the results to an operation requestor. The results processing component 180 handles any merging of data from fast and slow paths and any cleanup or other management needed after execution of the fast or slow path. The component 180 packages the results into an appropriate response format (e.g., a query response or other format), and sends the response to the requestor. Where iterators are used within the database engine, fast and slow operation results may be merged many times in each iterator. The next iterator (next operation) receives uniform merged data and splits the data again (if applicable) into slow and fast processing, and then merges results at the end so that data is ready to be consumed by users/servers or a subsequent operation. The requestor may include servers, applications, or users interacting with the system 100 over a network or from the same machine on which the system 100 executes. The result-processing component 180 provides result responses using an application programming interface (API) or protocol through which the system 100 received the request.

The computing device on which the data normalization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
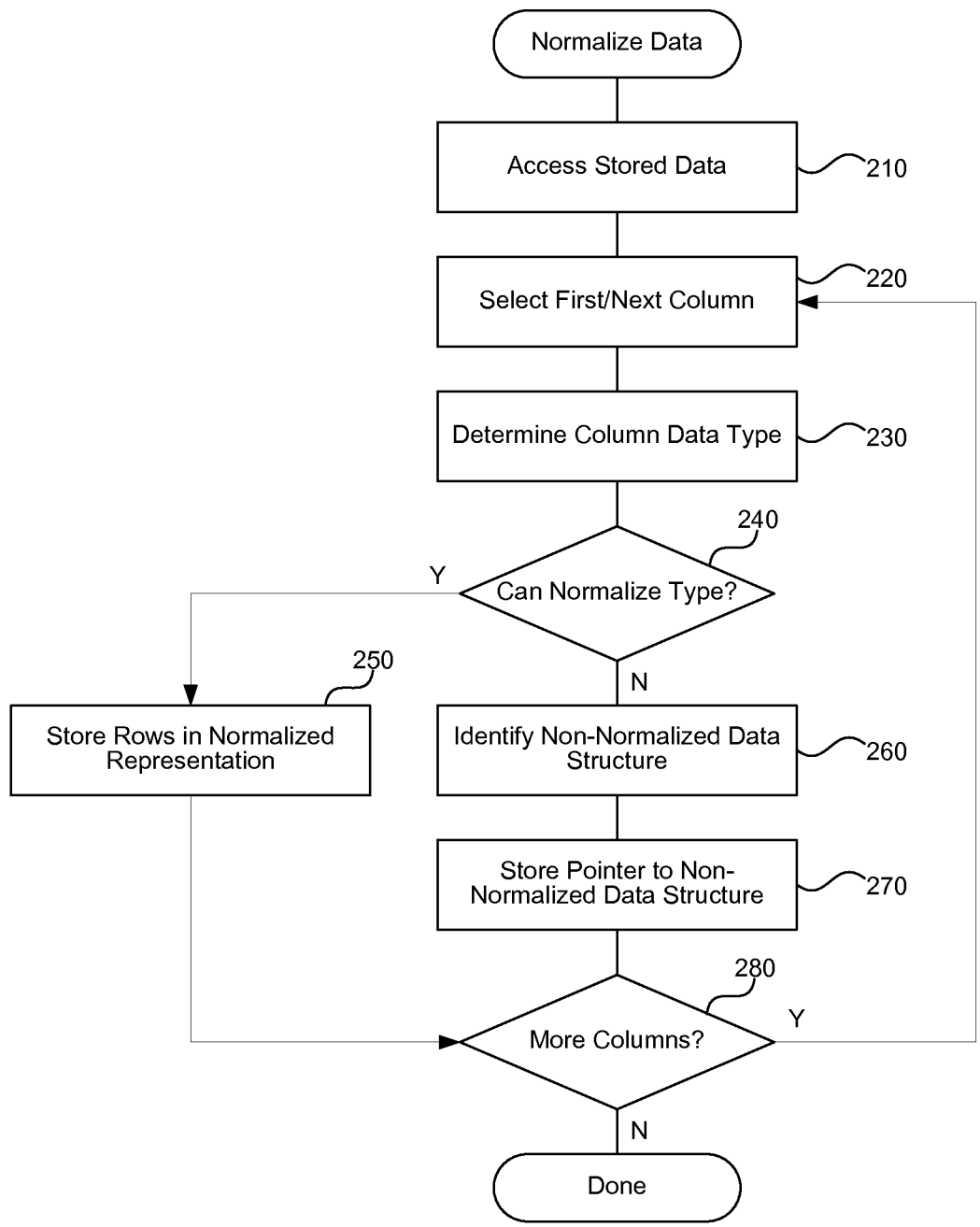
FIG. 2 is a flow diagram that illustrates processing of the data normalization system to normalize stored data in an in-memory representation, in one embodiment.

FIG. 2 is a flow diagram that illustrates processing of the data normalization system to normalize stored data in an in-memory representation, in one embodiment. Beginning in block 210, the system accesses stored data that includes multiple columns, each column having a data type. For example, the stored data may include file-based representation of a database, including tables with columns and rows of data. Continuing in block 220, the system selects the first column in the accessed data to determine an appropriate in-memory representation. For example, the stored data may include a list of columns for each table, and the system selects the first column for initial processing. On subsequent iterations, the system selects the next column until there are no more columns.

Continuing in block 230, the system determines a data type of the selected column. For example, the stored data may include column metadata that identifies a type of the column data declared by a database designer (e.g., bigint, varchar(20), and so forth). The system identifies the column type and any other information that may affect whether the column's row data can be stored in the normalized format (e.g., level of precision, limits on data length, and so forth). Continuing in decision block 240, if the system can normalize the determined column data type, then the system continues at block 250, else the system continues at block 260. The system may store a list of types that the system can normalize or other criteria such as a length limit for particular types that can be normalized. In some embodiments, the system may receive configuration information that determines whether the normalized format is used for storing data in memory, including conditions for determining when the format is used. For example, the system may only use the normalized format if more than half of a column's data values can be normalized.

Continuing in block 250, the system converts row data associated with the selected column into a normalized data representation. For example, the normalized data representation may include a fixed size numeric value into which the system stores multiple different native data types. For example, the system may store floats, dates, integers, Booleans, and other data types as a 64-bit integer in-memory. The normalized format allows the system to perform unified processing that is suited to superscalar processors on a variety of types of data.

If execution reaches block 260, the system identifies a non-normalized data structure for storing row data associated with the selected column. The system may store some rows as normalized and others as non-normalized, such as where some values fall outside of a range that the normalized format can contain. The non-normalized structure may include a traditional data structure used before the normalized format was introduced, or any other suitable data structure for describing the column/row data value. Continuing in block 270, the system stores a pointer to an instance of the identified non-normalized data structure in a normalized data value. For example, the system may set the normalized data value to the pointer value, and set an unused bit of the pointer value to indicate that the normalized value points to another data structure. In this way, when examining data values, the system can initially treat each value similarly.

Continuing in decision block 280, if the system determines that there are more columns in the accessed data, then the system loops to block 220 to select the next column, else the system completes. Although shown serially the system can also be implemented to process all columns or multiple columns at the same time while making fewer passes through the rows of data. After block 280, these steps conclude.

Figure 3:
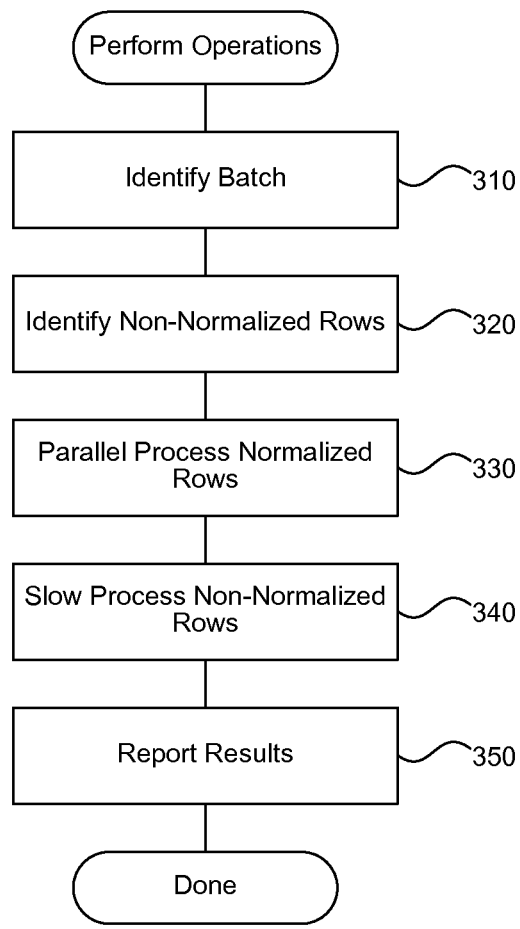
FIG. 3 is a flow diagram that illustrates processing of the data normalization system to perform an operation on a tabular set of data having rows and columns, in one embodiment.

FIG. 3 is a flow diagram that illustrates processing of the data normalization system to perform an operation on a tabular set of data having rows and columns, in one embodiment. Beginning in block 310, the system identifies a batch of operations that can be executed in parallel by a superscalar processor. For example, the system may determine that an operation operates on each element of an array of data, and that the processor can handle each element independently. In some cases, the system may identify multiple arrays of data that can be part of a batch, such as where elements of two arrays are being added together. The system assembles the batch and passes the batch to a function or component that includes a fast processing path for superscalar-ready data.

Continuing in block 320, the system identifies zero or more non-normalized rows of data associated with the batch of operations. The non-normalized rows may involve additional processing that is less suitable for parallel execution. The system may flag the identified rows, add them to a separate list, or ignore them in a first pass and process the identified rows in a post-processing step or second pass. Continuing in block 330, the system submits the identified batch of operations that involve normalized rows of data to the superscalar processor for parallel processing. The superscalar processor recognizes data with few or no data and control flow dependencies and sends the data to separate execution units for parallel processing. For example, where the data includes elements of an array, the processor may perform an operation in parallel on multiple elements of the array at a time. In some embodiments, the system performs the actions of blocks 320 and 330 at the same time to avoid reading the same data twice. Once data is read from memory into a CPU register, it is a relatively cheap operation to perform the actual operation and the normalization check.

Continuing in block 340, the system submits the identified batch of operations that involve identified non-normalized rows of data for processing. The processing of the non-normalized data may involve instructions that are less suitable for parallel processing, such as one or more conditional checks for correct handling of complex data types. By handling these rows in a separate way, the system allows those rows that can be processed quickly to benefit from the capabilities of the superscalar processor. Continuing in block 350, the system reports results of performing the batch of operations to a requestor of the operations. For example, the system may merge results from processing of the normalized data rows and the non-normalized data rows and provide the results in a data structure back to a caller or next operation to be executed, such as an application that requested a database query. After block 350, these steps conclude.

Figure 4:
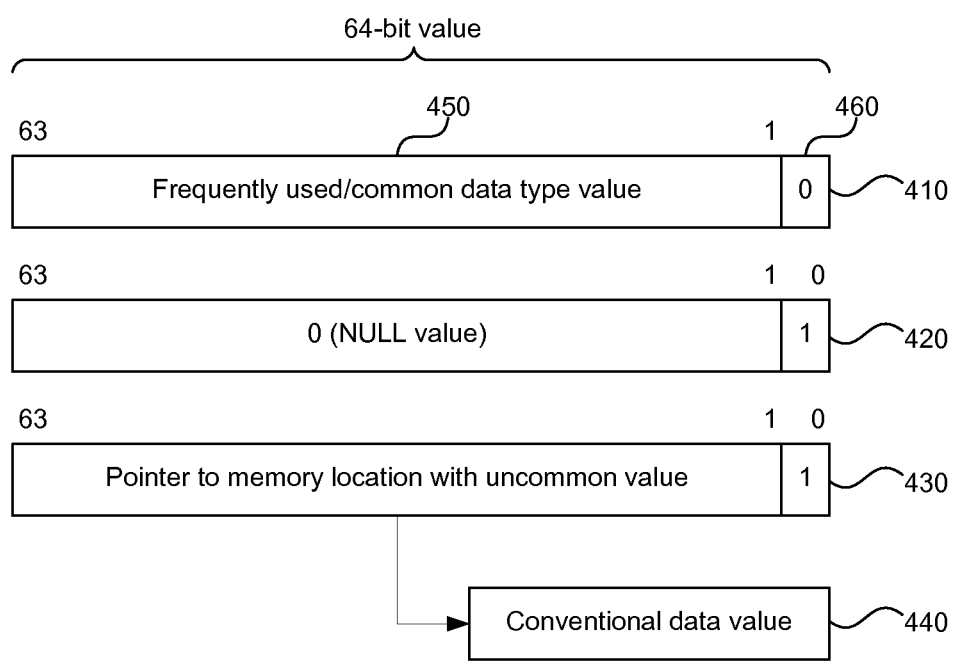
FIG. 4 is a block diagram that illustrates data values stored using the normalized representation described herein, in one embodiment.

FIG. 4 is a block diagram that illustrates data values stored using the normalized representation described herein, in one embodiment. The first data value 410 illustrates a common data type with a value that can be stored in the normalized data representation described herein. The least significant bit 460 is zero to indicate that the value is normalized data, and the remaining bits 450 store the actual value (e.g., a number for a numeric type). The data values are aligned (e.g., on a four-byte boundary), so that the system can safely assume that the lower bits are zeroes. This allows the least significant bit to be reused to indicate whether data is normalized or not. The second data value 420 illustrates one manner of representing NULL as a separate value from a numeric zero. The data value 420 sets the least significant bit to one to indicate a non-normalized value type, and the remaining bits to zero to indicate the value for NULL. The third data value 430 illustrates a data type or value that could not be represented in the normalized data representation. The least significant bit is set to one to indicate a non-normalized type, and the remaining bits contain a pointer to another data structure 440 that holds the actual value. The other data structure 440 may be any conventional data structure used in RDBMS to represent the non-normalized data type.

The data normalization system described herein can process many types of data very fast leveraging superscalar processors. Many types of common data fit within the normalized data representation described herein (e.g., zip codes, two-letter state codes, license plate numbers, and so forth). As one example, consider a database that stores a person's purchases. If an operation totals all purchases made by a person in a month, then the majority of the person's purchases (e.g., groceries, gas) fit within the normalized data types. Only very big-ticket items (e.g., a car purchase) might not fit in the normalized representation. For such an operation, the system can use the fast processing path for all of the data but the big-ticket items then follow up with a post-processing step using a potentially slower path to apply the operation to the outlying data that is not normalized.

In some embodiments, the data normalization system normalizes short strings by placing characters directly in the normalized data representation. For example, where each character of a string uses a byte and the normalized data structure includes seven full bytes and almost an eighth byte (one byte is used for indicating the normalized type), then the system can potentially store eight characters of a string in the normalized data representation. For longer strings, the system can include a pointer to the string or a pointer to another data structure that includes the string.

In some embodiments, the data normalization system determines a size of the normalized data structure separately for each type of data, so that smaller data types or ranges can be represented using less memory. For example, if an integer column in a table only contains values that will fit within a single byte, then the system may use a byte-sized data structure for the normalized representation of data in that column, so that less memory is allocated for storing the data of that column. For large numbers of rows of data, the saved memory may add up to be substantial.

From the foregoing, it will be appreciated that specific embodiments of the data normalization system have been described herein for purposes of illustration, but that various modifications may be made without deviating from the spirit and scope of the invention. Accordingly, the invention is not limited except as by the appended claims.

We claim:

1. A computer system for storing and processing data in a manner that encourages parallel processing by one or more superscalar processors, the system comprising:
    a processor and memory configured to execute software instructions;
    a data storage component configured to store database data persistently between sessions of use of the system;
    a data normalization component configured to retrieve data stored by the data storage component and to load the retrieved data into memory in a normalized data representation that allows fast superscalar processing, wherein the normalized data representation is a fixed size value and is sized such that it can be processed by the one or more superscalar processors as a single instruction;
    an operation manager configured to manage requests to perform database operations on stored database data;
    a batch assembly component configured to identify batches of data that have control flow and data independence such that the batch includes parallelizable operations;
    an outlier identification component configured to identify data values in a batch of data that cannot be performed by a fast processing path that performs efficient superscalar processing;
    a fast operation component configured to provide instructions to a superscalar processor in a manner that allows parallel execution of the instructions by multiple functional units of the superscalar processor;
    a slow operation component configured to perform database operations on data within a batch that is not stored in the normalized data representation; and
    a result processing component configured to gather results from the fast operation component and slow operation component and return the results to an operation requestor.

2. The system of claim 1 wherein the data normalization component is further configured to use a common format for storing multiple data types, so that processing of normalized data can be handled in a unified manner for a variety of data types.

3. The system of claim 1 wherein the data normalization component is further configured to provide an in-memory representation of data that is not normalized, by providing a normalized value that includes a pointer to a data structure for storing non-normalized values.

4. The system of claim 1 wherein the data normalization component is further configured to select an appropriate normalized representation for each data type.

5. The system of claim 1 wherein the result processing component is further configured to merge data from fast and slow paths into a unified result set.

6. The system of claim 1 further comprising:
    a query engine configured to:
        receive a query from one or more users or applications;
        develop a query plan;
        execute the query against a dataset; and
        provide results back to the one or more users or applications.

7. The system of claim 1 wherein the operation manager is further configured to invoke other components of the system to efficiently use the one or more superscalar processors.

8. The system of claim 1 wherein the batch assembly component is further configured to separate data into groups that minimize control flow interruptions.

9. The system of claim 1 wherein the batch assembly component is further configured to separate data into groups that can perform multiple operations on the one or more superscalar processors in an efficient manner.

10. The system of claim 1 wherein the outlier identification component is further configured to separate outlying data into a separate data structure.

11. The system of claim 1 wherein the outlier identification component is further configured to traverse an array of data and identify values in the array that are not represented in a normalized representation of the data.

12. The system of claim 11 wherein the outlier identification component is further configured to place the identified values in the array in a queue for post processing at a later time.

13. The system of claim 1 wherein the outlier identification component and the fast operation component are merged into a single component.

14. The system of claim 1 wherein the fast operation component is further configured to perform operations on the data in a tight loop or with multiple independent loop operations executable in each loop iteration.

15. The system of claim 1 wherein the slow operation component is further configured to process data that is of a nonstandard type.

* * * * *